United States Patent

Dufour et al.

(10) Patent No.: US 6,959,046 B2
(45) Date of Patent: Oct. 25, 2005

(54) RESYNCHRONIZATION METHOD FOR DECODING VIDEO

(75) Inventors: Cecile Dufour, Paris (FR); Yves Ramanzin, Paris (FR)

(73) Assignee: Koninklijke Philips Electronics N.V., Eindhoven (NL)

( * ) Notice: Subject to any disclaimer, the term of this patent is extended or adjusted under 35 U.S.C. 154(b) by 648 days.

(21) Appl. No.: 09/795,614

(22) Filed: Feb. 28, 2001

(65) Prior Publication Data

US 2002/0009152 A1 Jan. 24, 2002

(30) Foreign Application Priority Data

Mar. 7, 2000 (EP) .............................. 00400604

(51) Int. Cl.[7] .............................. H04B 1/66; H04N 7/12
(52) U.S. Cl. .................................. 375/240.28
(58) Field of Search ................ 375/240.01–240.29, 375/240.9; 711/1; 370/522; 714/701; 341/67; 348/499, 500, 501, 502; H04N 7/12; H04B 1/66

(56) References Cited

U.S. PATENT DOCUMENTS

| | | | |
|---|---|---|---|
| 5,956,741 A | * 9/1999 | Jones | 711/1 |
| 6,111,916 A | * 8/2000 | Talluri et al. | 375/240.23 |
| 6,310,897 B1 | * 10/2001 | Watanabe et al. | 370/522 |
| 6,415,398 B1 | * 7/2002 | Kikuchi et al. | 714/701 |
| 6,421,386 B1 | * 7/2002 | Chung et al. | 375/240.24 |
| 6,445,742 B1 | * 9/2002 | Yoo et al. | 375/240.27 |
| 6,539,121 B1 | * 3/2003 | Haskell et al. | 382/239 |
| 6,552,673 B2 | * 4/2003 | Webb | 341/67 |
| 6,754,277 B1 | * 6/2004 | Heinzelman et al. | 375/240.27 |
| 6,778,610 B2 | * 8/2004 | Lin | 375/240.27 |

OTHER PUBLICATIONS

J. Brailean, Ph. D, "Wireless Multimedia Utilizing MPEG–4 Error Resilient Tools" (Abstract) XP–000956235.

* cited by examiner

*Primary Examiner*—Tung Vo

(57) ABSTRACT

The present invention relates to a method of resynchronization that attempts to enable a resynchronization of a compressed video data signal received by a decoder, after a transmission error has been detected in said compressed video data signal.

The method of resynchronization is based on the use of a resynchronization word. In order to ensure a proper decoding of the compressed video data signal the resynchronization word is distinguishable from the known VLC words as well as the VOP start code.

6 Claims, 1 Drawing Sheet

RESYNCHRONIZATION METHOD FOR DECODING VIDEO

FIELD OF THE INVENTION

The present invention relates to a method of resynchronization of a compressed video data signal received by a decoder.

Such a resynchronization method may be used in, for example, an MPEG-4 decoding channel for a resynchronization of the decoding after a transmission error has been detected in the received compressed video data signal.

BACKGROUND OF THE INVENTION

A resynchronization method is known from the MPEG-4 Visual standard, referred to as MPEG-4 Visual Version 1, ISO/IEC 14496-2.

The MPEG-4 standard uses video objects, which are entities in a scene that a user may access and manipulate. To enable a video object to be accessed, it is necessary to have a coded representation of its shape. The instances of video objects at a given time are called video object planes (hereafter referred to as VOPs). A video object layer is a set of VOPs, whose shape type is identified by an integer called video_object_layer_shape.

Intra coded VOPs (hereafter referred to as I-VOPs) are coded without reference to other pictures. They provide access points to the coded sequence where decoding can begin, but are coded with only moderate compression. Predictive coded VOPs (hereafter referred to as P-VOPs) are coded more efficiently, using motion compensated prediction from past intra or predictive coded VOPs, and are generally used as a reference for further prediction. Bidirectionally predictive coded VOPs (hereafter referred to as B-VOPs) provide the highest degree of compression but require both past and future reference VOPs for motion compensation. Motion vectors are defined for each 16-sample by 16-line region of a VOP, hereafter referred to as a macro-block, or 8-sample by 8-line region of a VOP, hereafter referred to as a block, as required. Vop_fcode_forward and vop_fcode_backward are integers used in motion vector decoding.

The method of resynchronization described in the MPEG-4 standard is based on a resynchronization word, referred to as resync_marker, which is inserted into the compressed video data signal. A one-bit flag called "resync_marker_disable" is set to '1' to indicate that there is no resync_marker in the coded VOPs and to '0' to indicate that there is such a marker. The resynchronization word defined by the MPEG-4 standard is a binary string of at least 16 zeros followed by a one '0 0000 0000 0000 0001'. For an I-VOP or a VOP where the video_object_layer_shape has the value "binary_only", the resync_marker is 16 zeros followed by a one. The length of this resync_marker is dependent on the value of vop_fcode_forward, for a P-VOP, and the larger value of either vop_fcode_forward and vop_fcode_backward for a B-VOP. The relationship between the length of the resync_marker and appropriate fcode is given by 16+fcode. The resync_marker is (15+fcode) zeros followed by a one. It is only present when the resync_marker_disable flag is set to '0'. A resync_marker shall only be located immediately before a macro-block and be aligned with a byte.

SUMMARY OF THE INVENTION

It is an object of the invention to achieve a more reliable resynchronization of a compressed video data signal received by a decoder. The invention takes the following aspects into consideration.

A resynchronization word should be distinguishable from all possible bit sequences which may be comprised in the compressed video data signal, because we have no a priori knowledge where the resynchronization word may be. For example, in the MPEG-4 standard, a resynchronization word should be distinguishable from all possible Variable Length Code (hereafter referred to as VLC) words as well as the VOP start code, which marks the start of a VOP.

However, the MPEG-4 standard in its current stage allows some combinations of VLC words that could lead to the existence of unexpected resynchronization words in the compressed video data signal and, as a consequence, to a false resynchronization. One combination of bits, which is obtained from the decoding of a macro-block belonging to a B-VOP and which could lead to such an undesired resynchronization is the following:

macro-block mode for B-blocks (MODB): 00 macro-block type (MB_TYPE): 0001 coded block pattern for B-blocks (CBPB): 1000 00 quantizer information (DBQUANT): 0 motion vector VLC word: 0000 0000 0011 1

This example shows a particular combination of VLC words that comprises a set of 16 consecutive zeros followed by a one: 5 zeros corresponding to the CBPB VLC word, 1 corresponding to the DBQUANT VLC word, and 10 corresponding to the −15.5 motion vector VLC word. In this case, there is an ambiguity between this particular combination of VLC words and the resynchronization word, which is also constituted by 16 consecutive zeros (15+fcode, fcode being equal to 1 in this case) followed by a one. The particular combination of VLC words is capable of emulating a resynchronization which is not expected. In that case, a MPEG-4 video decoder cannot properly decode the compressed video data signal.

The method of resynchronization in accordance with the invention is characterized in that it comprises a step of detecting a resynchronization word that comprises at least 17 successive zeros followed by a one for a bidirectionally predictive coded video object plane.

As a consequence, said method of resynchronization will provide a more reliable resynchronization of the compressed video data signal, because it is based on a resynchronization word containing at least 17 successive zeros, even if fcode is equal to one, which is distinguishable from the particular combination of VLC words previously described. Said resynchronization method will thus ensure a proper decoding of a compressed video data signal comprising said particular combination of VLC words.

The present invention also applies to a video decoder implementing such a method of resynchronization and to a compressed video data signal carrying a resynchronization word as described in the method of resynchronization.

The present invention finally relates to a method of inserting a resynchronization word into a compressed video data signal and to a video encoder implementing such a method.

These and other aspects of the invention will be apparent from and elucidated with reference to the embodiments described hereinafter.

BRIEF DESCRIPTION OF THE DRAWINGS

The present invention will now be described, by way of example, with reference to the accompanying drawings, wherein.

DETAILED DESCRIPTION OF THE INVENTION

The present invention applies to a resynchronization method that attempts to enable a resynchronization of a compressed video data signal received by a decoder, after a transmission error has been detected in said compressed video data signal. Generally, the data between the synchronization point prior to the error and the first point where synchronization is restored, is discarded. If the resynchronization method locates the amount of data discarded by the decoder, this will greatly enhance the ability of other types of tools that recover data and/or conceal the effects of errors.

This method of resynchronization is described in the context of an MPEG-4 video data signal but is also applicable to other types of compressed video data signals which manipulate video objects.

The method of resynchronization is based on a division of a VOP into video packets. Such a method allows periodic resynchronization words to be provided throughout the compressed video data signal. Thus, the length of the video packets is not based on the number of macro-blocks, but on the number of bits contained in that packet, which makes the resynchronization method more accurate.

Figure 1:
FIG. 1 shows a video packet comprising a resynchronization word according to the invention.

FIG. 1 shows a typical video packet. This video packet comprises:
the resynchronization word (RW) used to mark the start of a new video packet,
header information such as the macro-block address (NUM) of the first macro-block contained in the packet, the quantization parameter (Q) and the Header Extension Code (HEC) ; the header information is necessary to restart the decoding process,
the macro-block data (MBD).

The resynchronization word must be distinguishable from all possible VLC words as well as the VOP start code. As described in the summary of the invention, a particular sequence of VLC words creates an ambiguity in the case of the resynchronization word of the background art.

Said sequence comprises:
a macro-block mode for B-blocks (MODB) VLC word. This MODB VLC word is present only in coded macro-blocks of B-VOPs and is equal to:
 1 if neither CBPB data nor MB_TYPE data are present for a macro-block,
 01 if only MB_TYPE data are present for a macro-block,
 00 if CBPB and MB_TYPE data are present for a macro-block.
a macro-block type (MB_TYPE) VLC word. This MB_TYPE VLC word is present only in coded macro blocks of B-VOPs for which one motion vector is included. The codes for MB_TYPE are 1, 01, 001 or 0001 depending on the motion vector type used.
a coded block pattern for B-blocks (CBPB) VLC word. This CBPB word is a 3 to 6 bit code, each bit in the code representing a coded/no coded status of a block. For each of the non-transparent blocks with coefficients, the corresponding bit in the code is set to '1'.
a quantizer information (DBQUANT) VLC word. This DBQUANT word specifies the change in quantizer for B-VOPs. The codes for DBQUANT are 10, 0 or 11.

a motion vector VLC word. This VLC word is a 1 to 13 bit code and contains up to 10 consecutive zeros as described in the following examples:

| Codes | Vector differences |
| --- | --- |
| 0000 0000 0010 1 | −16 |
| 0000 0000 0011 1 | −15.5 |
| 0000 0000 0011 0 | 15.5 |
| 0000 0000 0010 0 | 16 |

The definition of the above described VLC words leads to a combination of bits that comprises at the maximum a set of 17 consecutive zeros followed by a one: 6 zeros corresponding to the CBPB VLC word, 1 corresponding to the DBQUANT VLC word, and 10 corresponding to the motion vector VLC word. Said combination of bits can be ambiguous in the case of a resynchronization word having (15+fcode) zeros if fcode is equal to 1 or 2. It is a possible case because the value of fcode, corresponding to vop_fcode_forward or vop_fcode_backward, is a 3-bit integer taking values from 1 to 7, the value of zero being forbidden, and said values depending on the motion vector range.

As a consequence, the length of the resynchronization word has to be increased and must contain at least 17 successive zeros. The resynchronization word resync_marker in accordance with the invention is a binary string of at least 16 zeros followed by a one '0 0000 0000 0000 0001'. For an I-VOP or a VOP where the video_object_layer_shape has the value "binary_only", the resync_marker is 16 zeros followed by a one. The length of this resync_marker is dependent on the value of vop_fcode_forward, for a P-VOP, and the larger value of either vop_fcode_forward and vop_fcode_backward for a B-VOP. In a preferred embodiment, the relationship between the length of the resync_marker and appropriate fcode is given by 16+fcode for a P-VOP and 16+n+fcode for a B_VOP. The resync_marker is (15+fcode) zeros followed by a one for a P_VOP and (15+n+fcode) zeros followed by a one for a B_VOP, where n is an integer strictly higher than 0. It is only present when the resync_marker_disable flag is set to '0'. A resync_marker shall only be located immediately before a macro-block and be aligned with a byte.

Figure 2:
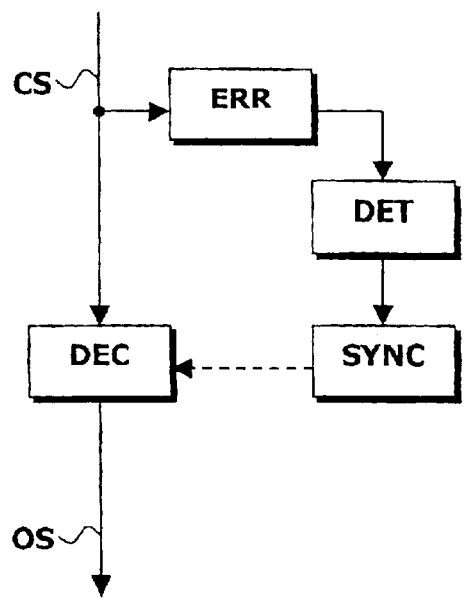
FIG. 2 is a flowchart illustrating a method of resynchronization in accordance with the invention.

FIG. 2 is a flowchart illustrating a method of resynchronization in accordance with the invention. During a decoding step (DEC) a compressed video data signal (CS) is received and an output signal (OS) is supplied. The output signal is analyzed during an error analysis step (ERR). When an error is detected in the compressed video data signal, such as, for example, an illegal VLC word or a semantic error, a detection step (DET) searches for a resynchronization word in the compressed video data signal. Said resynchronization word depends on the type of VOP and comprises:
 16 zeros followed by a one for an I-VOP,
 (15+fcode) zeros followed by a one for a P-VOP,
 (15+n+fcode) zeros followed by a one for a B-VOP,
 where n is an integer strictly higher than 0.
Finally, when a resynchronization word is detected, a synchronization step (SYNC) allows the decoding process to be restarted from the header information following the resynchronization word. The macro-block number (NUM) provides the spatial resynchronization while the quantization parameter (Q) allows the differential decoding process to be resynchronized.

In a first embodiment of the invention, a CBPB VLC word containing 6 consecutive zeros is not a possible combination, because this VLC word, which would correspond to 6 non-coded blocks, would then comprise a MODB VLC word equal to 1 or 01 (no CBPB data). In this case, the most unfavorable CBPB VLC word is '100000' and a value of n equal to 1 corresponding to a resynchronization word of (16+fcode) zeros followed by a one, is sufficient to avoid any ambiguity between said resynchronization word and the known VLC words.

In a second embodiment of the invention, a MODB VLC word equal to 00 associated with a CBPB VLC word containing 6 consecutive zeros is envisaged, because this combination of VLC words is allowed by the MPEG-4 standard. Consequently, the value of n is 2 corresponding to a resynchronization word of (17+fcode) zeros followed by a one, which precludes any ambiguity in the case of a combination of VLC words comprising a set of 17 consecutive zeros followed by a one: 6 zeros corresponding to the CBPB VLC word, 1 zero corresponding to the DBQUANT VLC word, and 10 zeros corresponding to the motion vector VLC word.

A method of resynchronization as described in FIG. 2 is implemented in an integrated circuit to be integrated in, for example, a video decoder.

The video decoder is adapted to receive a compressed input video data signal and comprises a detector for detecting the resynchronization word in the compressed input video data signal and a synchronizer for resynchronizing the decoding of the compressed input video data signal from the detection of the resynchronization word.

The present invention also applies to a method of inserting, into a compressed video data signal, a resynchronization word comprising at least 17 successive zeros, for example (15+n+fcode) zeros in the preferred embodiment, followed by a one for video data corresponding to a B-VOP. Such an insertion method is implemented in an integrated circuit to be integrated in, for example, a video encoder.

The corresponding video encoder is adapted to supply a compressed output video data signal and comprises means for inserting the resynchronization word in the compressed output video data signal.

Moreover, the signal supplied by such a video encoder or received by such a video decoder is recognizable as it contains a resynchronization word that comprises at least 17 successive zeros, for example (15+n+fcode) zeros in the preferred embodiment, followed by a one for video data corresponding to a B-VOP.

It will be obvious that the use of the verb "to comprise" and its conjugation does not exclude the presence of any other steps or elements than those defined in any claim. The word "a" or "an" preceding an element or step does not exclude the presence of a plurality of such elements or steps.

What is claimed is:

1. A method of resynchronization of a compressed video data signal received by a decoder, comprising a step of detecting a resynchronization word in the compressed video data signal and a step of synchronizing a decoding of the compressed video data signal from the detection of the resynchronization word, characterized in that the detection step is adapted to detect a resynchronization word that comprises at least 17 successive zeros followed by a one for video data corresponding to a bidirectionally predictive coded video object plane.

2. A video decoder for receiving a compressed video data signal, comprising a detector for detecting a resynchronization word in the compressed video data signal and a synchronizer for resynchronizing a decoding of the compressed video data signal from the detection of the resynchronization word, characterized in that said detector is adapted to detect a resynchronization word that comprises at least 17 successive zeros followed by a one for video data corresponding to a bidirectionally predictive coded video object plane.

3. A method of inserting a resynchronization word into a compressed video data signal supplied by an encoder, characterized in that said method is adapted to insert a resynchronization word that comprises at least 17 successive zeros followed by a one for video data corresponding to a bidirectionally predictive coded video object plane.

4. A video encoder for supplying a compressed video data signal and comprising means for inserting a resynchronization word into the compressed video data signal, characterized in that means for inserting are adapted to insert a resynchronization word that comprises at least 17 successive zeros followed by a one for video data corresponding to a bidirectionally predictive coded video object plane.

5. A computer program product for a video decoder that comprises a set of instructions which, when loaded into the decoder, causes the decoder to carry out the method of resynchronization of a compressed video data signal received by a decoder, comprising a stp of detecting a resynchronization word in the compressed video data signal and a step of synchronizing a decoding of the compressed video data signal from the detection of the resynchronization word, characterized in that the detection step is adapted to detect a resynchronization word that comprises at least 17 successive zeros followed by one for video data corresponding to a bidirectionally predictive video object plan.

6. A computer program product for a video encoder that comprises a set of instructions, which when loaded into the encoder, causes the encoder to carry out the method of inserting a resynchronization word into a compressed video data signal supplied by an encoder, characterized in that said method is adapted to insert a resynchronization word that comprises at least 17 successive zeros followed by a one for video data corresponding to a bidirectionally predictive coded video object plane.

* * * * *